Patented Mar. 9, 1954

2,671,764

UNITED STATES PATENT OFFICE 2,671,764

PROMOTED SUPPORTED SILVER SURFACE CATALYST AND PROCESS OF PREPARING SAME

Donald K. Sacken, Austin, Tex., assignor to Jefferson Chemical Company, Inc., New York, N. Y., a corporation of Delaware No Drawing. Application October 1, 1951, Serial No. 249,222

13 Claims. (Cl. 252—440)

This invention relates to the production of silver surface catalysts for catalyzing the oxidation of olefins to olefin oxides, for example, ethylene to ethylene oxide, and to the resultant catalysts.

In the catalytic oxidation of olefins to olefin oxides, particularly ethylene to ethylene oxide, side reactions take place, such as the complete oxidation of the ethylene to carbon dioxide and water, oxidation of the desired ethylene oxide product and its conversion to acetaldehyde which may then itself be further oxidized. The complete oxidation of ethylene to carbon dioxide and water liberates much more heat than the desired partial oxidation to ethylene oxide with consequent local overheating of the catalysts and formation of hot spots in the reactor. These hot spots favor complete oxidation of the ethylene to carbon dioxide so that a runaway reaction ensues and the yield of desired ethylene oxide is sharply reduced.

Among the objects of this invention is to provide a promoted silver surface catalyst for the oxidation of olefins to olefin oxides, particularly ethylene to ethylene oxides, which catalyst is of high activity and selectivity from the standpoint that it tends to favor the desired main reaction, i. e., the partial oxidation to olefin oxides and also is of increased or longer life.

Another object of this invention is to provide novel methods of producing such promoted catalysts.

Other objects and advantages of this invention will be apparent from the following detailed description thereof.

In accordance with this invention an alkali metal sulfate is incorporated in the catalyst. The alkali metal sulfate may be applied to the carrier or support before the silver surface is applied thereto, or the alkali metal sulfate may be mixed with silver oxide and the resultant mixture applied to the support.

Sodium, potassium, lithium, rubidium or cesium sulfate may be used. For reasons of availability, low cost, ease of application and effectiveness, sodium and potassium sulfate are the preferred promoters.

Catalysts embodying this invention exhibit superior performance in that they selectively favor the desired partial oxidation of olefins to olefin oxides, particularly ethylene to ethylene oxide, and tend to repress side reactions including the undesired complete oxidation to carbon dioxide and water. Further, they exhibit unexpected alkali metal sulfate acts as a promoter in selectively favoring the desired partial oxidation of olefins to olefin oxides and prevents or minimizes silver sintering, i. e., prevents recrystallization of the finely divided silver particles and thus maintains for a relatively long period of time the silver in a highly active and selective form for catalyzing the desired partial oxidation. While the examples given below support the above theory or possible explanation of effectiveness of the alkali metal sulfate, it will be understood this invention is not limited to this theory or possible explanation.

The alkali metal sulfate is incorporated in the catalyst in amounts of from about 15% to 150%, preferably from about 50% to 100%, by weight based on the weight of the silver oxide and from 0.5% to 10%, preferably from 1.5% to 3%, by weight based on the weight of the support. The silver oxide and support are mixed in proportions to result in a catalyst containing from 1 to 50%, desirably 2% to 20% and preferably 2% to 10% by weight of silver oxide based on the weight of the support. The silver oxide thus mixed with the support desirably is prepared by treating silver nitrate or other soluble silver salt, such as silver acetate with sodium hydroxide, potassium hydroxide, barium hydroxide or other hydroxide which precipitates silver oxide.

In accordance with a preferred embodiment of this invention the alkali metal sulfate promoter is incorporated in a catalyst produced by co-precipitating silver oxide and a silver salt that is appreciably more soluble than silver oxide, removing the silver salt from the co-precipitate and depositing the resultant silver oxide on the carrier or support. In the latter process the silver salt and silver oxide are co-precipitated in a weight ratio of at least about 0.75 part of silver oxide per part of silver salt and preferably in the weight ratio of from about 1 to about 10 parts of silver oxide per part of silver salt.

The process of producing silver surface catalysts by co-precipitating silver oxide and a silver salt, thereafter removing from the co-precipitate the silver salt and depositing the residual silver oxide on a carrier or support is disclosed and claimed in my copending application Serial No. 249,223, filed the same day as the date of this application; reference may be had to this copending application for a more complete disclosure of this process.

As the carrier or support, silicon carbide and

Alusite, Mullite and Tabular Corundum, crushed and screened to a convenient size, say from a fine dust to about 2 mesh, may be used. Any of the known carriers employed in the production of silver surface catalysts used for catalyzing the olefin to olefin oxide reaction may be employed. The exact size of the carrier particles will depend chiefly on the manner in which the catalyst is employed. In the case of fixed bed catalysts the preferred range of sizes is from 70 to 220 mesh (passing 70 and retained on 220 mesh screen) up to 2 mesh. Particularly preferred for fixed bed catalysts are catalyst particles having a size of from 2 to 10 mesh. Four catalysts employed in accordance with the fluidized technique, the particle size may be within the range of from a fine dust to approximately 70 mesh. A preferred carrier is a fused aluminum oxide, such as the product designated as Alundum No. 38 by the Norton Company, hereinafter referred to as Alundum No. 38.

The alkali metal sulfate promoter may be incorporated in the catalyst, for example, by washing the carrier or support with an aqueous solution of the promoter, drying the thus washed support at a temperature of from 110° to 180° C. and then mechanically mixing the dried support with a silver oxide paste.

Alternatively, a solution of the promoter is prepared of a volume such that all of it is absorbed by the support or carrier. After soaking up the promoter solution in a batch of the support particles, the latter is dried at a temperature of from 110° to 180° C. then mixed with silver oxide and the silver oxide coated particles dried at a temperature of from 105° to 240° C.

Still a third method is to form a slurry of silver oxide in an aqueous solution of the promoter and agitate this slurry with a batch of the support particles to coat them. Thereafter the catalyst is dried at a temperature of from 105° to 240° C.

In all three methods the mixing is preferably carried out at room temperature (25° to 35° C.), although higher or lower temperatures can be used, provided the solutions remain liquid and are below their boiling points.

The third method briefly described above has been found particularly advantageous when the silver surface of the catalyst is derived from a co-precipitate of silver oxide and a soluble silver salt, which soluble silver salt is removed from the co-precipitate and the residual silver oxide thereafter deposited on the carrier or support. The co-precipitate may be prepared by treating a silver nitrate solution or a solution of other soluble silver salt with a pre-mixed solution of sodium sulfate and sodium hydroxide. Preferably, the sodium sulfate is added first to the silver nitrate solution followed by the addition of the sodium hydroxide so as to effect co-precipitation of the silver oxide and silver sulfate. The addition of the sodium sulfate to the silver nitrate solution followed by the addition of the sodium hydroxide permits the silver sulfate to form nuclei or particles upon which the silver oxide builds. The amount of sodium hydroxide employed should be at least equal to the stoichiometric amount required to react with that portion of the silver nitrate in excess of that portion which forms the silver sulfate. However, an excess of up to 50% over and above this stoichiometric amount may be used, preferably a 20% excess of sodium hydroxide is employed. As above noted, the weight ratio of silver oxide to silver sulfate precipitated is at least 0.75 to 1 and preferably is from 1 to 10 to 1.

The temperature of the precipitation medium may vary from just above 0° C. to just below the boiling point of water, say within the range of 5° to 95° C. Preferably, the precipitation is effected at temperatures within the range of 15° to 80° C. Following the precipitation but before the co-precipitate is washed, the co-precipitate is preferably digested at the temperature of precipitation, say at temperatures of from 5° to 95° C. for from 5 to 30 minutes. Preferably, this digestion is carried out at a temperature of from 60° to 80° C. for about 30 minutes, since it has been found digestion at such temperature for about 30 minutes provides reproducible batches from the standpoint of catalytic activity and selectivity.

Following the digestion treatment the co-precipitate is separated from the reaction mixture, for example, by decantation and then washed, desirably with distilled water at a temperature of from 5° to 95° C., preferably at room temperature (25°–35° C.), to effect removal of the silver sulfate. In the preferred operation the co-precipitate is subjected to repeated washings until all of the silver sulfate has been removed or only a trace remains. Catalysts having improved selectivity result even though as much as 30% of the silver sulfate remains. Such catalysts have been found to be of materially lower activity than the catalysts in which substantially all of the silver sulfate has been removed from the co-precipitate. The residual silver oxide is then dried. This drying may be carried out at any temperature below the sintering temperature of the silver oxide, preferably drying is effected at a temperature within the range of from 105° to 215° C.

The resultant silver oxide is then deposited on a support or carrier, desirably by agitating the support with a slurry or paste of the silver oxide. From 15% to 150% sodium sulfate, based on the weight of silver oxide, is dissolved in the slurry or paste which is deposited on the carrier. This addition of sodium sulfate results in a catalyst of improved selectivity, activity and life.

In use of the catalyst the silver oxide is converted to silver by heating, desirably by passing a stream of olefin and air at a temperature of 250°–290° C. over the catalyst. If desired, before the catalyst is introduced into the converter, it may be subjected to a reduction treatment, say with ammonia or hydrogen, or such reduction treatment may be carried out in the converter before the reactants are introduced thereinto. It will be understood that the expression "silver catalyst" is employed in the specification and claims to include silver oxide catalysts.

The following examples are illustrative of preferred embodiments of this invention. It will be understood, however, this invention is not limited to these examples.

EXAMPLES I TO III, INCLUSIVE

In Examples I to III, data on which are given in Table 1 below, the catalysts were prepared employing the procedure of washing the carrier with an aqueous solution of the promoter noted in Table 1, drying, then mechanically mixing the dried carrier with silver oxide paste and drying the resulting mass. The carrier used in Examples I to III, inclusive, was Alundum No. 38 which was washed three times with equal volumes of distilled water (the volume of distilled water used in each wash was equal to the volume of the carrier particles), and then twice with equal volumes of aqueous sodium sulfate solutions of the concentration indicated in Table 1. The thus treated carrier was drained and then dried while stirring at a temperature of about 150° C.

35 ml. of 10% sodium hydroxide solution at 38° C. was added rapidly to 150 grams of 10% silver nitrate solution also at 38° C. and the resulting mixture stirred well for 30 seconds. The mixture was then allowed to stand for 15 minutes and washed eight times by decantation using 100 ml. per wash.

100 ml. of the promoter coated support prepared as hereinabove described was then added to the washed silver oxide, the mixture stirred and dried at 140° to 164° C. while stirring.

The catalysts were tested by placing them in a stainless steel converter and passing a mixture of air and ethylene containing 10 volumes of air per volume of ethylene at a space velocity of about 400 and an average contact time of 2.4 seconds through a fixed bed of the catalyst maintained at a temperature of about 280° C.

For comparative purposes a catalyst was prepared following the same procedure omitting only the step of washing the carrier with an aqueous solution of the promoter. This catalyst was tested in the same manner. The results follow:

Table 1

| Example No. | Promoter | Preparative Date | Weight Ratio of Carrier to Silver Oxide | Activity | Yield | Conversion |
|---|---|---|---|---|---|---|
| 1 | sodium sulfate | 2 washes of carrier with .1% sodium sulfate | 20.7 | 65.1 | 55.3 | 36.0 |
| 2 | do | 2 washes of carrier with 20.0% sodium sulfate | 20.7 | 85.3 | 46.9 | 40.0 |
| 3 | do | 2 washes of carrier with 30.0% sodium sulfate | 20.7 | 75.5 | 58.8 | 44.4 |

The results of the comparative test were as follows:

| Weight Ratio of Carrier to Silver Oxide | Activity | Yield | Conversion |
|---|---|---|---|
| 20.7 | 90.3 | 38.3 | 34.6 |

EXAMPLES IV AND V

Examples IV and V involved the preparation of the catalyst by soaking the carrier in a solution of the promoter indicated in Table 2 of a volume such that substantially all of the promoter solution was absorbed by the carrier. The carrier particles containing the absorbed promoter solution was dried for 16 hours while agitating at 130° to 135° C. The dried carrier particles were then coated with silver oxide following the procedure described above in connection with Examples I to III, inclusive. The resulting catalyst was tested in the same manner as in the testing of Examples I to III.

For comparative purposes a catalyst was prepared following the same procedure as in Examples IV and V, except that no promoter was incorporated. This catalyst was tested in the same manner. The results follow:

Table 2

| Example No. | Promoter | Preparative Data | Weight Ratio of Carrier to Promoter | Weight Ratio of Carrier to Silver Oxide | Weight Ratio of Silver Oxide to Promoter | Activity | Yield | Conversion |
|---|---|---|---|---|---|---|---|---|
| 4 | sodium sulfate | Alundum No. 38 slurried with 3% of its weight of sodium sulfate in water and dried. | 33.3 | 21.1 | 1.6 | 78.7 | 47.0 | 37.0 |
| 5 | potassium sulfate | Alundum No. 38 slurried with 0.5% by weight of potassium sulfate in water and dried. | 200 | 15.4 | 13 | 56.1 | 51.0 | 28.6 |

The results of the comparative test employing a catalyst made by stirring 207 grams water washed Alundum No. 38 with 10 grams freshly precipitated silver oxide were as follows:

| Weight Ratio of Carrier to Silver Oxide | Activity | Yield | Conversion |
|---|---|---|---|
| 20.7 | 90.3 | 38.3 | 34.6 |

EXAMPLES VI AND VII

The catalysts in Examples VI and VII were prepared by coating the carrier with a slurry containing the freshly precipitated and washed silver oxide and the promoter in distilled water. The catalyst was tested in the same manner as in the case of Examples I to III above.

Comparative catalysts were prepared differing from the catalysts of Examples VI and VII chiefly in that they were free of promoter, and these comparative catalysts were tested in the same manner. The results follow:

Table 3

| Example No. | Promoter | Preparative Data | Weight Ratio of Carrier to Promoter | Weight Ratio of Carrier to Silver Oxide | Weight Ratio of Silver Oxide to Promoter | Activity | Yield | Conversion |
|---|---|---|---|---|---|---|---|---|
| 6 | sodium sulfate | 220 grams of Alundum No. 38, 13 grams silver oxide, 2.5 grams sodium sulfate slurried together and dried with stirring. | 88 | 16.9 | 5.2 | 63.9 | 58.1 | 37.1 |
| 6a | | same catalyst, but after 800 hours of use | 88 | 16.9 | 5.2 | 77.2 | 54.8 | 42.3 |

The results of the comparative test using a catalyst made by stirring 207 grams water washed Alundum No. 38 with 10 grams freshly precipitated silver oxide were as follows:

| Weight Ratio of Carrier to Silver Oxide | Activity | Yield | Conversion |
|---|---|---|---|
| 20.7 | 90.3 | 38.3 | 34.6 |

| Example No. | Promoter | Preparative Data | Weight Ratio of Carrier to Promoter | Weight Ratio of Carrier to Silver Oxide | Weight Ratio of Silver Oxide to Promoter | Activity | Yield | Conversion |
|---|---|---|---|---|---|---|---|---|
| 7 | sodium sulfate | 13 grams silver oxide, 220 grams Alundum No. 38, 6.8 grams sodium sulfate slurried with 45 ml. of water and dried. | 32.4 | 16.9 | 1.91 | 57.1 | 63.4 | 36.2 |

The results of the comparative test using a catalyst made by slurrying and drying 13.3 grams of silver oxide, 215 grams of Alundum No. 38, 30 milliliters water were as follows:

| Weight Ratio of Carrier to Silver Oxide | Activity | Yield | Conversion |
|---|---|---|---|
| 16.3 | 53.1 | 28.8 | 15.3 |

The catalyst employed in Example VI above was subjected to a life test of about 1800 hours. Its performance is summarized in Table 4.

Table 4

| Time, Hours | Activity | Yield | Conversion |
|---|---|---|---|
| 1 | 58.5 | 56.1 | 32.8 |
| 150 | 77.1 | 56.8 | 43.8 |
| 460 | 75.0 | 55.9 | 41.9 |
| 551 | 80.1 | 55.2 | 44.2 |
| 745 | 74.2 | 56.1 | 41.6 |
| 837 | 77.2 | 54.8 | 42.3 |
| 1,156 | 72.6 | 53.6 | 38.9 |
| 1,431 | 78.1 | 49.3 | 38.5 |
| 1,596 | 85.4 | 47.1 | 40.2 |
| 1,806 | 77.6 | 52.6 | 40.8 |

EXAMPLE VIII 316 grams of silver nitrate were dissolved in 2 liters of distilled water and the solution heated to 69° C. Separate solutions of sodium hydroxide and sodium sulfate were prepared by dissolving 56.4 grams of sodium sulfate and 51.2 grams of sodium hydroxide, respectively, in 500 ml. portions of distilled water. 200 ml. of the sodium hydroxide solution were mixed with the sodium sulfate solution and this mixture added to the hot silver nitrate solution while agitating. 30 seconds later the remainder of the sodium hydroxide solution was added to the silver nitrate solution while continuing the agitation for 3 minutes. After stopping the agitation the precipitates were allowed to settle and digest at a temperature of 61° to 66° C. for 30 minutes. The mixture was allowed to cool to about 53° C. and the aqueous liquid decanted from the precipitate. The precipitate was washed by decantation with five 3-liter portions and one liter portion of distilled water. The temperatures of the washes were in the range of from 27° to 34° C. Each wash involved stirring the co-precipitate with the distilled water for about 2 minutes and then allowing the mixture to settle before decanting. The washed precipitate was dried in a forced circulation oven for about 16 hours at 120° C.

A second batch was prepared in an identical fashion to that described above and the two batches combined. 24 grams of the combined dried precipitates were slurried with about 100 ml. of distilled water and then passed through a homogenizer to reduce the particle size. 6 grams of sodium sulfate were dissolved in the slurry. The resultant mixture was sprayed by means of a spray gun onto 300 grams of 8 to 16 mesh silicon carbide contained in a heated rotating cylinder. Drying was effected almost instantly.

The catalyst was tested for the oxidation of ethylene in the same manner as described in Examples I to III with the following results:

| Activity | Yield | Conversion |
|---|---|---|
| 34.5 | 65.2 | 22.5 |

For comparative purposes silver oxide precipitated from an aqueous silver nitrate solution by the addition of sodium hydroxide was washed eight times with distilled water and then coated on the same type of silicon carbide support. This catalyst was tested in the same manner with the following results:

| Activity | Yield | Conversion |
|---|---|---|
| 50 | 0.6 | 0.3 |

EXAMPLE IX 140 grams of the combined and dry precipitates of Example VIII were slurried with distilled water and passed through a homogenizer. 25 grams of sodium sulfate were dissolved in this slurry. The resultant slurry was sprayed onto 600 grams 4–8 mesh Alundum.

This catalyst was tested in the same manner as in the case of the preceding examples with the following results:

| Activity | Yield | Conversion |
|---|---|---|
| 82.1 | 62.4 | 51.2 |

In all of the above examples by "activity" is meant the percentage of the total ethylene which is oxidized. By the "yield" is meant the percentage of oxidized ethylene which is converted to ethylene oxide. By "conversion" is meant the percentage of the feed ethylene which is converted to ethylene oxide.

It will be noted the promoted silver surface catalysts embodying this invention are of high activity and selectivity from the standpoint that they tend to favor the desired partial oxidation of olefins to olefin oxides and are of exceptionally long life.

Since certain changes may be made in carrying out of the process of making the catalysts or in the catalysts themselves without departing from the scope of the invention, it is intended that all matter contained in the above description shall be interpreted as illustrative and not in a limiting sense.

What is claimed is:

1. In a process for producing a supported silver surface catalyst, the steps which comprise incorporating an alkali metal sulfate in the catalyst as a promoter.

2. In a process for producing a supported silver surface catalyst, the steps which comprise washing the support with an aqueous solution of an alkali metal sulfate and thereafter depositing silver oxide thereon.

3. In a process for producing a supported silver surface catalyst, the improvement which comprises depositing on the support an alkali metal sulfate and silver oxide.

4. In a process for producing a supported silver surface catalyst for catalyzing the oxidation of olefins to olefin oxides, the steps which comprise washing the support with an aqueous solution of sodium sulfate and thereafter depositing silver oxide thereon.

5. In a process for producing a supported silver surface catalyst for catalyzing the oxidation of olefins to olefin oxides, the steps which comprise coating the support with a slurry of silver oxide in a solution of sodium sulfate.

6. In a process for producing a supported silver surface catalyst for catalyzing the oxidation of olefins to olefin oxides, the steps which comprise incorporating in the supported silver surface catalyst from 0.5% to 10% by weight based on the weight of the support of an alkali metal sulfate.

7. In a process for producing a supported silver surface catalyst for catalyzing the oxidation of olefins to olefin oxides, the steps which comprise incorporating in the catalyst from 0.5% to 10% by weight of sodium sulfate based on the weight of the support, the catalyst containing from 1% to 50% by weight of silver oxide based on the weight of the support.

8. A process for producing a supported silver surface catalyst for catalyzing the oxidation of olefins to olefin oxides, which comprises washing aluminum oxide particles having a particle size of from a fine dust to about 2 mesh with a dilute solution of an alkali metal sulfate, drying the thus washed particles, depositing on the resultant particles freshly precipitated silver oxide and reducing the silver oxide to silver.

9. In a process for producing a supported silver surface catalyst for catalyzing the oxidation of olefins to olefin oxides, the steps which comprise agitating aluminum oxide particles having a particle size of from a fine dust to about 2 mesh with a slurry of silver oxide in an aqueous solution of sodium sulfate, the concentration of sodium sulfate and silver oxide in said slurry being such as to produce a catalyst containing from 1.5% to 3% sodium sulfate based on the weight of the aluminum oxide and from 2% to 20% silver oxide based on the weight of the alumium oxide.

10. A supported silver surface catalyst containing an alkali metal sulfate promoter.

11. A supported silver surface catalyst having sodium sulfate incorporated therein as a promoter.

12. A supported silver surface catalyst for catalyzing the oxidation of olefins to olefin oxides, comprising a support having from 0.5% to 10% alkali metal sulfate based on the weight of the support and from 1% to 50% silver oxide based on the weight of the support.

13. A supported silver surface catalyst for catalyzing the oxidation of olefins to olefin oxides, comprising a support having from 1.5% to 3% sodium sulfate based on the weight of the support and from 2% to 20% silver oxide based on the weight of the support.

DONALD K. SACKEN.

References Cited in the file of this patent

UNITED STATES PATENTS

| Number | Name | Date |
|---|---|---|
| 2,125,333 | Carter | July 2, 1938 |
| 2,424,085 | Bergsteinsson et al. | July 15, 1947 |